(12) United States Patent
Azibert et al.

(10) Patent No.: US 12,000,489 B2
(45) Date of Patent: Jun. 4, 2024

(54) ELASTOMER SPRING TYPE MECHANICAL SEAL

(71) Applicant: A.W. Chesterton Company, Groveland, MA (US)

(72) Inventors: Henri Vincent Azibert, Windham, NH (US); Joseph K. Kaleshian, Burlington, MA (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 18/111,373

(22) Filed: Feb. 17, 2023

(65) Prior Publication Data

US 2023/0258267 A1    Aug. 17, 2023

Related U.S. Application Data

(60) Provisional application No. 63/311,305, filed on Feb. 17, 2022.

(51) Int. Cl.
*F16J 15/36* (2006.01)

(52) U.S. Cl.
CPC ..................... *F16J 15/36* (2013.01)

(58) Field of Classification Search
CPC ....................................................... F16J 15/36
See application file for complete search history.

(56) References Cited

U.S. PATENT DOCUMENTS

| | | | | |
|---|---|---|---|---|
| 2,489,545 A * | 11/1949 | Storer | ...................... | F16J 15/36 277/392 |
| 2,559,963 A * | 7/1951 | Jensen | ...................... | F16J 15/36 277/393 |
| 2,599,034 A * | 6/1952 | Wilkinson | ............... | F16J 15/36 277/377 |
| 2,736,624 A * | 2/1956 | Schoenrock | ............. | F16J 15/36 277/374 |
| 4,838,560 A * | 6/1989 | Heilala | ................... | F16J 15/363 277/371 |
| 4,889,348 A * | 12/1989 | Amundson | .......... | F16J 15/3412 277/306 |
| 5,938,205 A * | 8/1999 | Azibert | ................ | F16J 15/3404 277/408 |
| 6,918,593 B2 | 7/2005 | Takahashi | | |
| 7,708,285 B2 | 5/2010 | Grimanis et al. | | |
| 2004/0150166 A1 * | 8/2004 | Takahashi | ................ | F16J 15/36 277/370 |

(Continued)

FOREIGN PATENT DOCUMENTS

| | | |
|---|---|---|
| EP | 3 527 860 A1 | 8/2019 |
| WO | 89/02555 A1 | 3/1989 |
| WO | 2004/068008 A2 | 8/2004 |

*Primary Examiner* — Vishal A Patel
(74) *Attorney, Agent, or Firm* — Nelson Mullins Riley & Scarborough LLP

(57) ABSTRACT

A mechanical seal assembly having a gland assembly, a rotary seal ring, a stationary seal ring, a sleeve assembly having a flange portion for mounting the rotary seal ring, a cover sealing element for seating over the flange portion and contacting a portion of the rotary seal ring, and an energizer sealing element axially spaced from the cover sealing element for sealing a portion of the stationary seal ring and the gland assembly and for providing an axial biasing force to the stationary seal ring.

17 Claims, 10 Drawing Sheets

(56) References Cited

U.S. PATENT DOCUMENTS

2004/0227297 A1\* 11/2004 Azibert ................ F16J 15/3448
  277/361
2014/0348687 A1\* 11/2014 Weigl ................... F16J 15/3488
  277/309

\* cited by examiner

ELASTOMER SPRING TYPE MECHANICAL SEAL

RELATED APPLICATION

The present application claims priority to U.S. provisional patent application Ser. No. 63/311,305, filed on Feb. 17, 2022, and entitled Rolling Elastomer Spring Mechanical Seal, the contents of which are herein incorporated by reference.

BACKGROUND OF THE INVENTION

Conventional mechanical seals are employed in a wide variety of environments and settings, such as for example, in mechanical apparatuses, to provide a fluid-tight seal. The mechanical seals are usually positioned about a rotating or reciprocating shaft or rod that is mounted in and protrudes from a stationary mechanical housing.

The mechanical seals are employed in a wide variety of mechanical apparatuses to provide a pressure-tight and fluid-tight seal. The mechanical seal is usually positioned about a rotating shaft that is mounted in and protruding from stationary equipment. The mechanical seal is usually bolted to the stationary equipment at the shaft exit, thus preventing the loss of pressurized process fluid from the stationary equipment. Conventional split mechanical seals include face-type mechanical seals, which include a pair of seal rings that are concentrically disposed about the shaft and are axially spaced from each other. The seal rings each have sealing faces that are biased into sealing contact with each other. Usually, one seal ring remains stationary while the other seal ring is coupled to the shaft and rotates therewith. The mechanical seal prevents leakage of the pressurized process fluid to the external or ambient environment by biasing the seal ring sealing faces into sealing contact with each other. The rotary seal ring is usually mounted in a holder assembly or a sleeve which is disposed in a chamber formed by a gland assembly and the stationary equipment. If employed, the holder assembly can have a pair of holder halves or segments secured together by a screw. Likewise, the gland assembly can have a pair of gland halves or segments that are also secured together by a screw. The seal rings are also often divided into segments, each segment having a pair of sealing faces, thereby resulting in each ring being a split ring that can be mounted about the shaft without the necessity of freeing one end of the shaft.

Prior art mechanical seals have rotary and stationary components assembled around the shaft and then bolted on to the equipment to be sealed. A rotary seal face is inserted into a rotary metal clamp after the segments are assembled around the shaft. Then, the stationary face segments and gland segments are assembled and the split gland assembly is then bolted to the pump housing. Alternatively, the stationary and rotary sealing components can be preassembled into subassemblies that can then be mounted about the shaft.

The conventional mechanical seals typically struggle to properly seal slurry type process fluids. The slurry type process fluids can serve to degrade the seal performance over time, thus requiring repair and replacement. This increases the overall maintenance costs of the facility and is deleterious to plant performance since the equipment is typically shut down for service.

SUMMARY OF THE INVENTION

The present invention is directed to a mechanical seal assembly for providing a fluid seal between a rotating shaft and a static surface of an equipment housing and/or gland assembly for use in sealing process fluids with high abrasive particle content, i.e. slurries. The mechanical seal assembly includes first and second axially adjacent annular seal ring elements that allow for large axial adjustments of the shaft without dismantling the seal, while concomitantly protecting the seal components from the abrasive process environment. The first rotary seal ring element rotates with the shaft against a second static or stationary seal ring element. A static housing, such as gland assembly, receives the second static seal element that is coupled to an elastomeric sealing element, such as an axially rolling spring type sealing element having a flex region to provide an axial preloading or biasing force between the seal faces of the seal ring elements as well as a cover portion for covering a portion of the stationary seal ring. One end of the sealing element is coupled to an outwardly extending surface of the gland assembly that would normally be exposed to the slurry. The extended spring surface protects the exposed static annular housing from abrasive particles and provides a secondary axial seal surface between the equipment and the stationary housing. The present invention can also employ a second sealing element that is positioned within the mechanical seal assembly so as to couple to a sleeve assembly that seats the rotary seal ring and to cover a portion of the outer surface of the rotary seal ring. The sealing element can include connection features that facilitate the coupling of the sealing element to the sleeve and to the rotary seal ring.

The present invention is directed to a mechanical seal assembly for mounting about a shaft for sealing a slurry within stationary equipment. The mechanical seal assembly includes a gland assembly configured for coupling to the stationary equipment. The gland assembly includes a main body having a radially extending outer surface and an opposed radially extending inner surface and the main body extends from an axially outer end to a radially inner end and a portion of the radially inner end forms an overhang portion. The inner surface has a gland channel formed therein in the overhang portion. The mechanical seal assembly also includes a rotary seal ring having an outer surface and configured for rotary movement when coupled to the shaft, a stationary seal ring disposed in sealing contact with the rotary seal ring to form a fluid seal therebetween, and a sleeve assembly having a main body having a flange portion formed at a first end defining a space for seating the rotary seal ring and a sleeve portion having an outer surface. The main body of the sleeve assembly has an inner surface having an engagement channel formed therein at the first end. A support ring element is further provided and positioned to contact the outer surface of the sleeve portion of the sleeve assembly.

The mechanical seal assembly also includes a cover sealing element and an energizer sealing element. The cover sealing element is disposed so as to contact at least a portion of the flange portion of the sleeve assembly and at least a portion of the outer surface of the rotary seal ring. The outer surface of the cover sealing element has a flat end surface portion having a radially inwardly extending end lip portion formed at a terminal end region and a tapered end surface portion coupled to the flat end surface portion. The inner surface of the cover sealing element has a first inner surface having a diameter that is greater than a second radially inwardly stepped inner surface, and the first inner surface and the second inner surface are coupled by a radially extending stepped wall surface having a wall channel formed therein. The wall channel has a wall lip portion that overlies a portion of the wall channel, and a bottom portion of the flange portion seats within the wall channel and the wall lip portion seats within and engages the engagement channel.

The first inner surface of the cover sealing element has a cover channel formed therein and the flange portion of the sleeve assembly has a protrusion extending outwardly from an outer surface therefrom for seating within the cover channel.

The energizer sealing element of the mechanical seal assembly is axially spaced from the cover sealing element and is disposed so as to contact at least a portion of the stationary seal ring to apply an axial biasing force thereto. The energizer sealing element has a main body having a cover portion formed at a first end and a flex portion formed at an opposed second end, and the flex portion has a terminal end region that includes a connection feature for seating in the gland channel so as to couple the flex portion to the gland assembly. The inner surface of the cover portion of the energizer sealing element has one or more protrusions formed thereon, and wherein the stationary seal ring has an outer surface having a stator channel formed therein, wherein the protrusion is configured to seat within the stator channel of the stationary seal ring when assembled together. The second inner surface of the cover sealing element has one or more protrusions formed thereon for engaging with the shaft to form a fluid seal between the cover sealing element and the shaft.

According to the present invention, the inner surface of the cover portion of the energizer sealing element includes a stepped wall portion that includes a first stepped wall surface that transitions to a second stepped wall surface, the support ring element has a first end positioned adjacent to the stationary seal ring and has an annular wall feature formed at the first end, and the inner surface of the cover portion contacts the outer surface of the stationary seal ring and the second stepped wall surface of the cover portion contacts the annular wall feature of the support ring element when assembled together.

The flex portion of the energizer sealing element is disposed in an energized position when the energizer sealing element is coupled to the gland assembly and to the stationary seal ring, and wherein the flex portion of the energizer sealing element when disposed in the energized position forms a bent intermediate portion for energizing the stationary seal ring.

The present invention is also directed to a mechanical seal assembly having a gland assembly configured for coupling to the stationary equipment, a rotary seal ring having an outer surface and configured for rotary movement when coupled to the shaft, a stationary seal ring disposed in operative sealing contact with the rotary seal ring to form a fluid seal therebetween, and a sleeve assembly having a main body having a flange portion formed at a first end defining a space for seating the rotary seal ring and a sleeve portion having an outer surface. The main body of the sleeve assembly has an inner surface having an engagement channel formed therein at the first end. The mechanical seal assembly also includes a cover sealing element disposed so as to contact at least a portion of the flange portion of the sleeve assembly and at least a portion of the outer surface of the rotary seal ring, and an energizer sealing element axially spaced from the cover sealing element and disposed so as to contact at least a portion of the stationary seal ring to apply an axial biasing force thereto. The energizer sealing element has a main body having an outer surface and an inner surface, and the main body of the energizer sealing element includes a cover portion formed at a first end thereof and a flex portion formed at an opposed second end thereof. The flex portion has a terminal end region that includes a connection feature for seating in the gland channel so as to couple the flex portion to the gland assembly.

The mechanical seal assembly further includes a support ring element positioned to contact the outer surface of the sleeve portion of the sleeve assembly, wherein the support ring element has an outer surface and an inner surface.

The gland assembly has a main body having a radially extending outer surface and an opposed radially extending inner surface. The main body extends from an axially outer end to a radially inner end and a portion of the radially inner end forms an overhang portion. The inner surface has a gland channel formed in the overhang portion.

The outer surface of the cover sealing element has a flat end surface portion having a radially inwardly extending end lip portion formed at a terminal end region and a tapered end surface portion coupled to the flat end surface portion. The inner surface of the cover sealing element has a first inner surface having a diameter that is greater than a second radially inwardly stepped inner surface, and the first inner surface and the second inner surface are coupled by a radially extending stepped wall surface having a wall channel formed therein. The wall channel has a wall lip portion that overlies a portion of the wall channel, and a bottom portion of the flange portion seats within the wall channel and the wall lip portion seats within and engages the engagement channel. The first inner surface of the cover sealing element has a cover channel formed therein and the flange portion of the sleeve assembly has a protrusion extending outwardly from an outer surface therefrom for seating within the cover channel.

According to the present invention, the inner surface of the cover portion of the energizer sealing element has one or more protrusions formed thereon. The stationary seal ring has an outer surface having a stator channel formed therein, and the protrusion is configured to seat within the stator channel of the stationary seal ring when assembled together. Further, the inner surface of the cover portion of the energizer sealing element includes a stepped wall portion that includes a first stepped wall surface that transitions to a second stepped wall surface. The support ring element has a first end positioned adjacent to the stationary seal ring and has an annular wall feature formed at the first end. The inner surface of the cover portion contacts the outer surface of the stationary seal ring and the second stepped wall surface of the cover portion contacts the annular wall feature of the support ring element when assembled together.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION OF THE INVENTION

Figure 1:
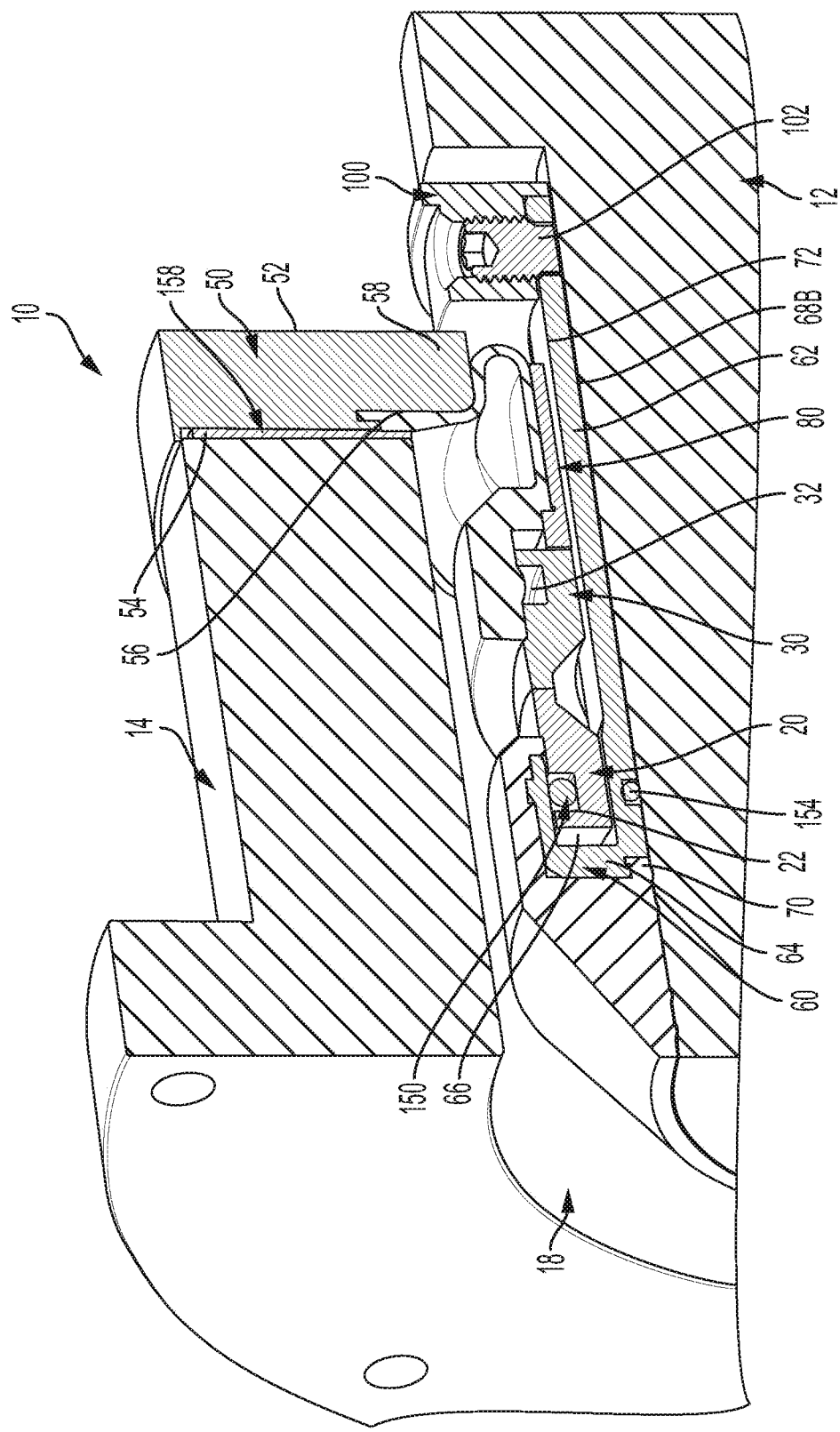
FIG. 1 is a partial cross-sectional perspective view of the mechanical seal assembly according to the teachings of the present invention.

The present invention provides a mechanical seal assembly employing a cover sealing element and an energizer sealing element for sealing selected components of the seal assembly, including at least portions of seal rings, a sleeve assembly, and a gland assembly. The invention will be described below relative to illustrated embodiments. Those skilled in the art will appreciate that the present invention may be implemented in a number of different applications and embodiments and is not specifically limited in its application to the particular embodiment depicted herein.

The terms "mechanical seal assembly" and "mechanical seal" as used herein are intended to include various types of mechanical fluid sealing systems, including single or solid seals, split seals, concentric seals, spiral seals, tandem seals, dual seals, cartridge seals, gas seals, and other known mechanical seal and sealing types and configurations.

The term "shaft" is intended to refer to any suitable device in a mechanical system to which a mechanical seal can be mounted and includes shafts, rods and other known devices. The shafts can move in any selected direction, such as for example in a rotary direction or in a reciprocating direction.

The terms "axial" and "axially" as used herein refer to a direction generally parallel to the axis of a shaft. The terms "radial" and "radially" as used herein refer to a direction generally perpendicular to the axis of a shaft. The terms "fluid" and "fluids" refer to liquids, gases, and combinations thereof.

The terms "axially inner" or "axially inboard" as used herein refer to the portion of the stationary equipment and a mechanical seal proximate the stationary equipment employing the mechanical seal. Conversely, the terms "axially outer" or "axially outboard" as used herein refer to the portion of stationary equipment and a seal assembly distal from the mechanical system.

The term "radially inner" as used herein refers to the portion of the mechanical seal proximate a shaft. Conversely, the term "radially outer" as used herein refers to the portion of the mechanical seal distal from a shaft.

The terms "stationary equipment" and/or "static surface" as used herein are intended to include any suitable stationary structure housing a shaft or rod to which a seal having a gland is secured.

The terms "process medium" and/or "process fluid" as used herein generally refers to the medium or fluid being transferred through the stationary equipment. In pump applications, for example, the process medium is the fluid being pumped through the pump housing.

The term "gland" as used herein is intended to include any suitable structure that enables, facilitates or assists securing the mechanical seal to the stationary equipment, while concomitantly surrounding or housing, at least partially, one or more seal components. If desired, the gland can also provide fluid access to the mechanical seal. Those of ordinary skill will also recognize that the gland assembly can form part of the mechanical seal assembly or form part of the stationary equipment.

The term "slurry" or "slurry process fluid" as used herein is intended to include a process or other type of fluid that contains solid particles or particulates. As such, the slurry can be a mixture of denser solid material particulate material that is suspended in a carrier fluid, such as water. The most common use of slurry is as a means of transporting solids or separating minerals, where the carrier fluid is pumped by a device, such as a centrifugal pump, that employs the mechanical seal assembly of the present invention. The size of the solid particles can vary in size. The particles may settle below a certain transport velocity and the mixture can behave like a Newtonian or a non-Newtonian fluid. Depending on the mixture, the slurry can be abrasive and/or corrosive. The fluid can be, for example, a Newtonian fluid having or exhibiting Newtonian properties, namely, the viscosity only varies as a response to changes in temperature or pressure. Specifically, the viscosity of a Newtonian fluid remains constant independent of the amount of shear applied thereto for a constant temperature. Thus, Newtonian fluids have a linear relationship between viscosity and shear stress. The Newtonian fluid has the ability to settle out the particulates from the carrier fluid relatively easily and quickly. The Newtonian fluids can also be referred to as a settling slurry. The particulates in the settling slurry are typically greater than or equal to about 100 µm. The fluid can also be a non-Newtonian fluid having or exhibiting non-Newtonian properties, such that when a shear force is applied thereto, the viscosity of the non-Newtonian fluid decreases or increases as a function of the type of fluid. The non-Newtonian fluid has difficultly settling out particulates, and hence is also referred to as a non-settling slurry (e.g., homogenous mixture). In non-settling slurries, the fluid includes a more homogenous mixture of the fluid and particulates. The particulates in the non-settling slurry are typically less than about 100 µm. The slurry can different types of slurries, such as a clean slurry, a light slurry, or a heavy slurry.

The mechanical seal assembly of the present invention is shown for example in FIG. 1. The illustrated mechanical seal assembly 10 is concentrically disposed about a shaft 12 that extends along a first or shaft axis and is mounted within and secured to stationary equipment 14, such as a pump or other mechanical device. The shaft 12 can be mounted, at least partly, within or adjacent to the stationary equipment 14. The mechanical seal assembly 10 can be constructed to provide a fluid-tight seal, thereby preventing a process fluid or medium, which can include a slurry, from escaping the stationary equipment 14 and from damaging or degrading the mechanical seal. The fluid-tight seal is achieved by sealing members, illustrated as a pair of seal rings 20 and 30. The illustrated seal rings include a first or rotary seal ring 20 and a second or stationary seal ring 30 that can be disposed in operative sealing contact with each other to form a seal therebetween. The stationary seal ring has a main body having an outer surface having a rotor channel or groove 22 formed therein. The rotor channel 22 can be sized and configured for mounting a sealing element 150, such as an O-ring. Similarly, the stationary seal ring 30 includes a main body having an outer surface having a stator channel or groove 32 formed therein. The stator channel 32 is also sized and configured to seat a sealing element. Each of the stationary seal ring 20 and the rotary seal ring 30 has a smooth arcuate sealing surface that are biased into sealing contact with each other by any suitable biasing assembly, such as by the energizer sealing element 130. The seal rings 20 and 30 can be solid or can be split into a pair of seal ring segments, respectively, to facilitate easy installation of the mechanical seal assembly 10. The sealing surfaces of the seal rings 20, 30 provide a fluid-tight seal operable under a wide range of operating conditions. According to one embodiment, the seal rings 20 and 30 can be similarly or identically shaped.

The mechanical seal assembly 10 can also include a gland assembly 50 and a holder or sleeve assembly 60 that seats within the gland assembly 50 and within the stationary equipment 14. The illustrated sleeve assembly 60 can have any selected shape or configuration, and in the illustrated embodiment has a main body that is formed as a sleeve that is disposed about and is rotatably coupled to the shaft 12. The sleeve assembly 60 is disposed within the interior space 18 formed by the gland assembly 50 and the stationary equipment 14. The main body of the sleeve assembly 60 has an elongated sleeve portion 62 and a flange portion 64 disposed at an axial inboard end that is configured to form a channel 66 that defines a space for receiving and retaining the rotary seal ring 20. According to one embodiment, the flange portion 64 has a generally or substantially U-shaped configuration. The sleeve portion 62 has an outer surface 68A and an opposed inner surface 68B that can have any selected number of grooves formed therein for seating one or more sealing elements, such as for example for seating the sealing element 154. The sealing element 154 is configured to form a seal between the sleeve 60 and the shaft 12 and to seal a process fluid in the stationary equipment 14. The inner surface 68B also has a cut-out portion formed therein to form an engagement channel or region 70 disposed at an end portion of the sleeve in the area of the flange portion 64 to form a seal retention mechanism. The engagement channel 70 is configured to receive a portion of a protective seal, such as for example a portion of the cover sealing element 90.

Figure 10:
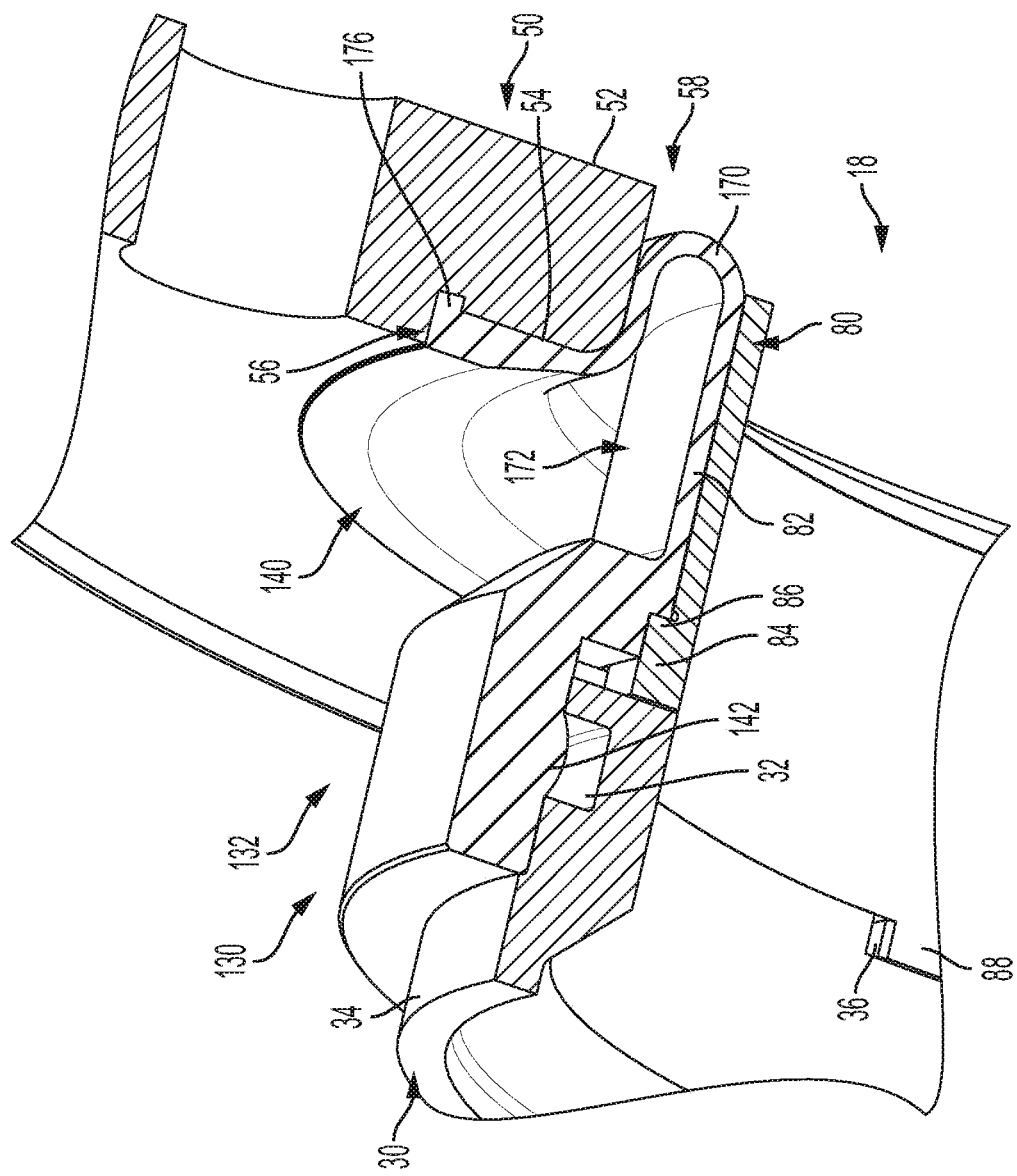
FIG. 10 is a partial cross-sectional perspective view showing the energizer sealing element mounted in the mechanical seal assembly of the present invention showing the sealing element coupled to the gland assembly, a support ring element, and the stationary seal ring.

With reference to FIGS. 1 and 10, the illustrated mechanical seal assembly 10 also includes a support ring element 80 that seats on the outer surface 68A of the sleeve portion 62 of the sleeve 60. The support ring element 80 has a main body having an outer surface 82 and an opposed inner surface. The outer surface 82 includes a wall portion 84 formed at an axially inner end that has a stepped wall surface 86 that extends radially outwardly from the outer surface 82. The wall portion 84 includes a connection feature 88 that extends outwardly therefrom in the axial direction and which is configured to seat within a complementary shaped channel or seat 36 formed in the stationary seal ring 30 so as to mechanically couple the support ring element 80 thereto. The complementary shaped channel 36 is formed at an end of the stationary seal ring 30 that is opposite the sealing surface. The support ring element 80 is hence mechanically coupled to the stationary seal ring 30 so as to remain stationary during operation of the seal. The support ring element 80 is also positioned so as to contact a sealing element, such as the energizer sealing element 130, to help support the seal element during operation and during various pressure conditions.

The mechanical seal assembly 10 also includes a lock ring assembly 100 for seating about an end portion of the sleeve portion 62 of the sleeve assembly 60 and for securing the sleeve assembly 60 to the shaft 12. Specifically, the lock ring assembly 100 employs a pin 102 for securing the sleeve assembly 60 to the shaft 12, thus allowing the sleeve assembly to rotate therewith.

The gland assembly 50 is concentrically disposed about the shaft 12 and is mounted through known fastening mechanisms and according to known fastening techniques to the stationary equipment 14. The gland element 50 includes a main body having an outer surface 52 and an opposed inner surface 54. The main body is concentric in shape and can be sized and configured to extend from a radially outer end to a radially inner end that extends radially inwardly into the space 18 relative to the stationary equipment 14 so as to form an overhang portion 58. The inner surface 54 has a groove 56 formed therein in the form of a cut-out region in the area of the overhang portion 58 that is sized and configured for receiving a portion of the sealing element, such as the energizer sealing element 130. The mechanical seal assembly 10 can also include an annular gland sealing element or gasket 158 that can be disposed between the gland assembly 50 and the stationary equipment 14 to form a fluid seal therebetween.

The mechanical seal assembly 10 also includes a pair of specially configured sealing elements that can be employed to help protect the components of the mechanical seal assembly when the mechanical seal is being used to seal a slurry material. The slurry material forms the process fluid that is housed within the stationary equipment 14. According to one embodiment, the mechanical seal assembly 10 can employ a cover sealing element 90 that is disposed axially inwardly within the seal and is positioned to cover at least a portion of the flange portion 64 of the sleeve assembly 60 and at least a portion the rotary seal ring 20. The cover sealing element 90 is configured to couple to the sleeve assembly and to rotate therewith. The mechanical seal assembly 10 also includes an energizer sealing element 130 that is disposed at an axial outboard end of the mechanical seal assembly and is positioned to apply an axial biasing force to the stationary seal ring 30 to place the sealing surfaces or faces of the seal rings in mating sealing engagement with each other and to form an outboard seal to prevent the process fluid from escaping from the stationary equipment 14 to the ambient environment. The cover sealing element 90 is shown for example in FIGS. 1-6. The illustrated cover sealing element 90 has a main body 92 that has an outer surface 94 and an inner surface 108. The outer surface 94 has a relatively flat end surface portion 96 that transitions to a tapered end surface portion 98. The tapered end surface portion 98 can be tapered in any selected manner. For example, the tapered end portion 98 preferably has a diameter that is larger at a location 100 that is adjacent to the flat end surface portion 96 and transitions to a diameter that is smaller at a terminal end region 102 of the main body 92. According to one embodiment, as shown, the tapered end surface portion 98 tapers in a continuous linear manner from the location 100 to the terminal end portion or region 102. The flat end surface portion 92 can optionally include a tapered end portion 104 that terminates at the terminal end region 106. The flat end surface portion 92 has a lip portion 110 formed at an outer terminal end 106 that extends radially inwardly and functions as a first capture or retention mechanism.

The inner surface 108 of the main body 92 of the cover sealing element 90 can include an upper inner surface 108A that is opposed to the flat end surface portion 92 and a lower inner surface 108B that is opposed to the tapered end surface portion 98. The upper inner surface 108A has a diameter that is greater than the diameter of the lower inner surface 108B. The inner surface 108A also has an annular channel or groove 112 formed therein. The lower inner surface 108B is stepped radially inwardly, when mounted within the mechanical seal assembly, relative to the upper inner surface 108A to form a stepped wall portion 114. Specifically, the upper inner surface 108A is coupled to the lower inner surface 108B by the radially extending stepped wall portion 114. The stepped wall portion 114 can include a wall channel 116 that is formed therein for seating the flange portion 64 of the sleeve assembly 60. The stepped wall portion 114 also has a wall lip portion 118 that overlies a portion of the wall channel 116. The wall lip portion and the wall channel 116 cooperate with the engagement channel 70 formed in the sleeve assembly 60 to form a second capture or retention mechanism.

Figure 6:
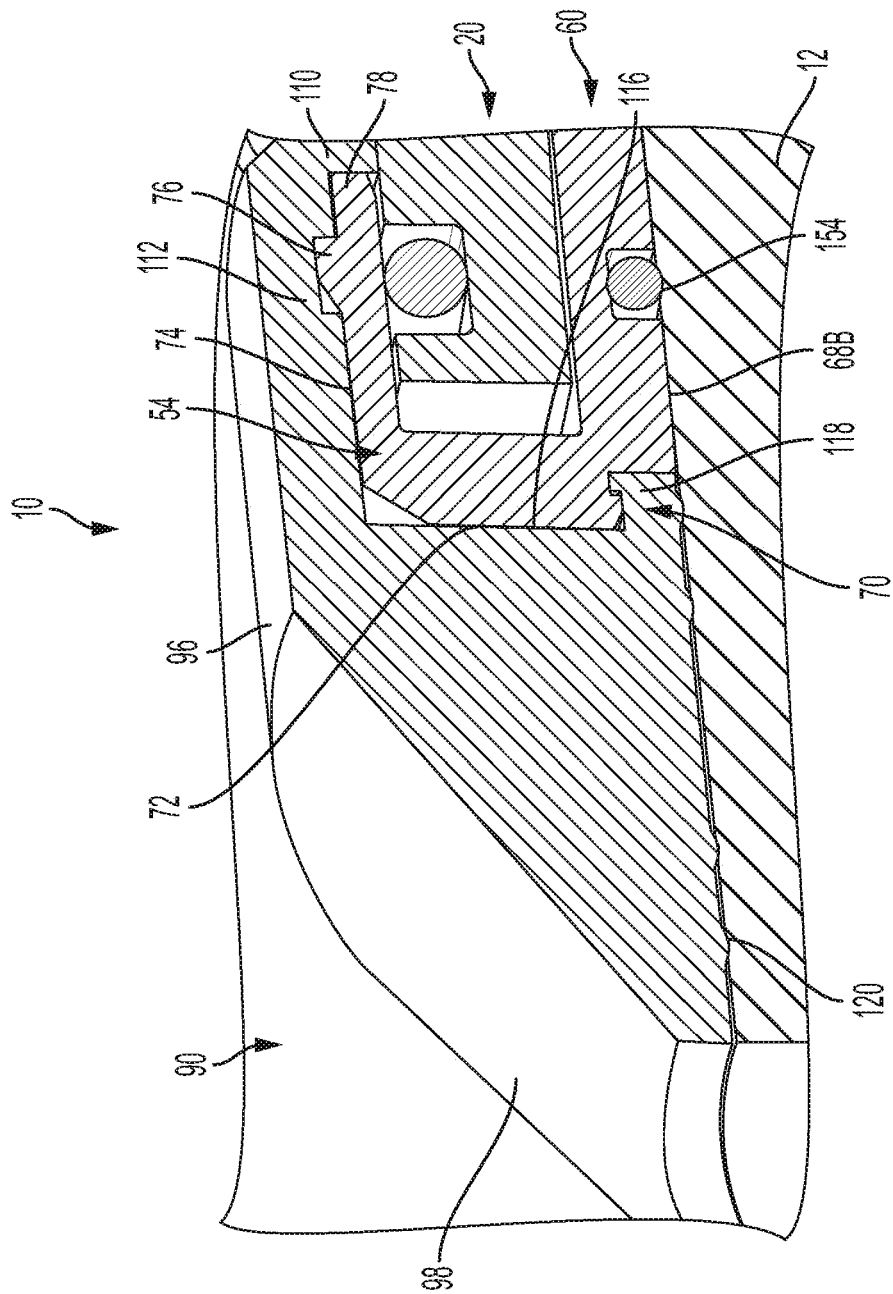
FIG. 6 is a partial cross-sectional perspective view of the mechanical seal assembly showing the coupling of the cover sealing element to the sleeve assembly according to the teachings of the present invention.

As shown for example in FIG. 6, the wall channel 116 formed in the cover sealing element 90 is sized and configured to seat the bottom portion 72 of the flange portion 64. The lip portion 118 of the wall channel 116 engages with the engagement channel 70 formed in the cut-out portion on the inner surface 68B of the sleeve assembly 60. The engagement of the lip portion 118 and the channel 70 helps mechanically link or couple together the cover sealing element 90 and the sleeve assembly 60. Further, the end lip portion 110 overlies a top portion 78 of the flange portion 64 of the sleeve assembly 60 when assembled together. When coupled together, the lip portion 110 helps connect and capture the flange portion 64. In this configuration, a protrusion 76 formed on the outer surface 74 of the flange portion 64 is seated within the channel 112 formed along the upper inner surface 108A of the cover sealing element 90. The protrusion 76 serves to function as an additional capture or retention mechanism between the cover sealing element 90 and the sleeve assembly 60.

The lower inner surface 108B of the cover sealing element 90 can optionally include one or more protrusions 120 that extend radially inwardly towards the shaft 12 from the inner surface 108B. The protrusions 120 are sized and configured to contact the shaft 12 to form a seal between the cover sealing element 90 and the shaft. The protrusions 120 help prevent the process medium or fluid, such as a slurry, from passing along the outer surface of the shaft 12.

The illustrated cover sealing element 90 helps protect the flange portion 64 of the sleeve assembly 60 and at least a portion of the rotary seal ring 20 from damage (e.g., abrasion) caused by the harmful particulates typically present in the slurry type process fluid. Further, the cover sealing element 90 helps provide or form a secondary seal between the sleeve assembly 60 and the shaft 12. The illustrated cover sealing element 90 has multiple different capture and retention mechanisms formed therein to help secure the sealing element to the sleeve assembly. For example, the cover sealing element 90 has a wall channel 116 and corresponding lip 118 formed in the stepped wall portion 114 of the inner surface 108 to help capture and secure the flange portion 64 of the sleeve assembly 60. Further, the outer terminal end 106 of the main body 92 has a lip 110 formed thereon for mating with and securing the top surface 78 of the flange element 64. Still further, the upper inner surface 108A of the sealing element has a channel 112 formed therein for seating the protrusion 76. The protrusion and channel 112 further assist in securing the cover sealing element 90 to the sleeve assembly 60.

Figure 2B:
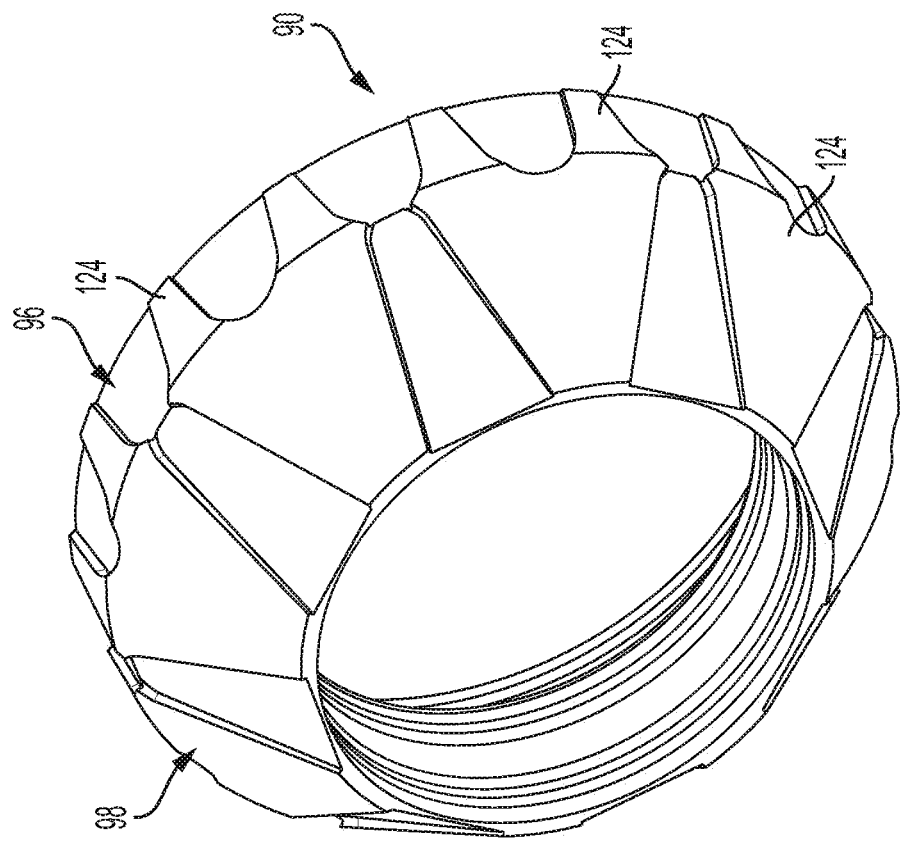
FIG. 2B is a perspective view of a second embodiment of a rotary cover sealing element that is configured to couple to the sleeve assembly of the mechanical seal assembly of the present invention.
Figure 2A:
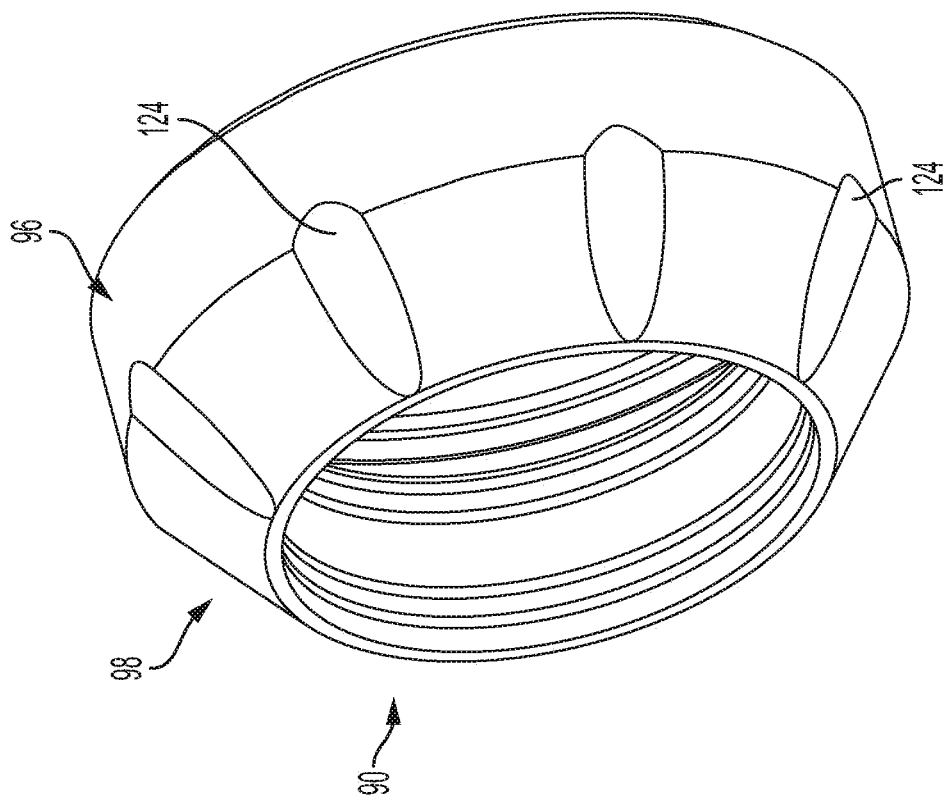
FIG. 2A is a perspective view of a first embodiment of a rotary sealing element that is configured to couple to a sleeve assembly of the mechanical seal assembly of the present invention.
Figure 3:
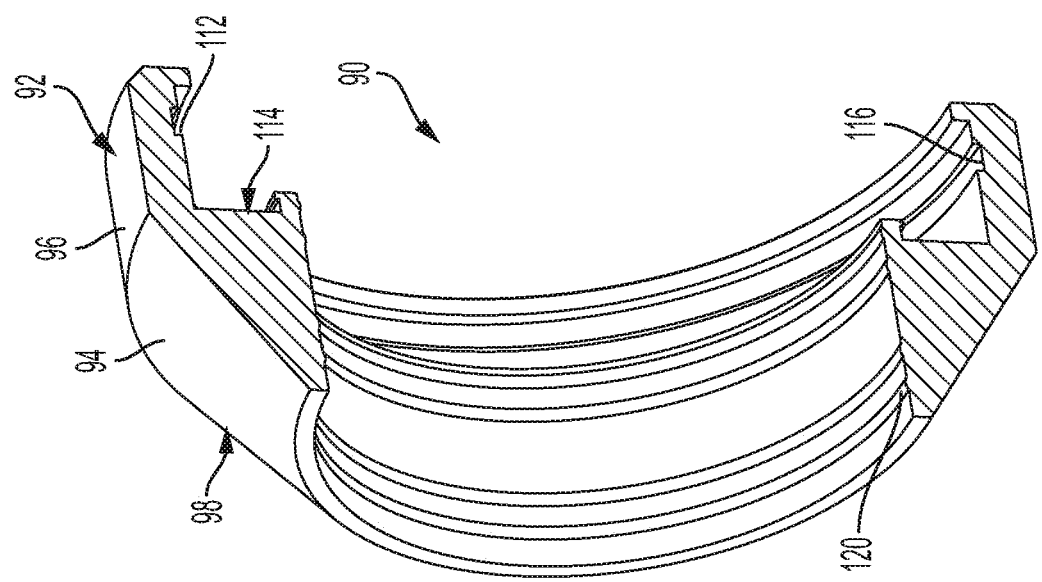
FIG. 3 is a cross-sectional perspective view of the rotary cover sealing element of the present invention.
Figure 4:
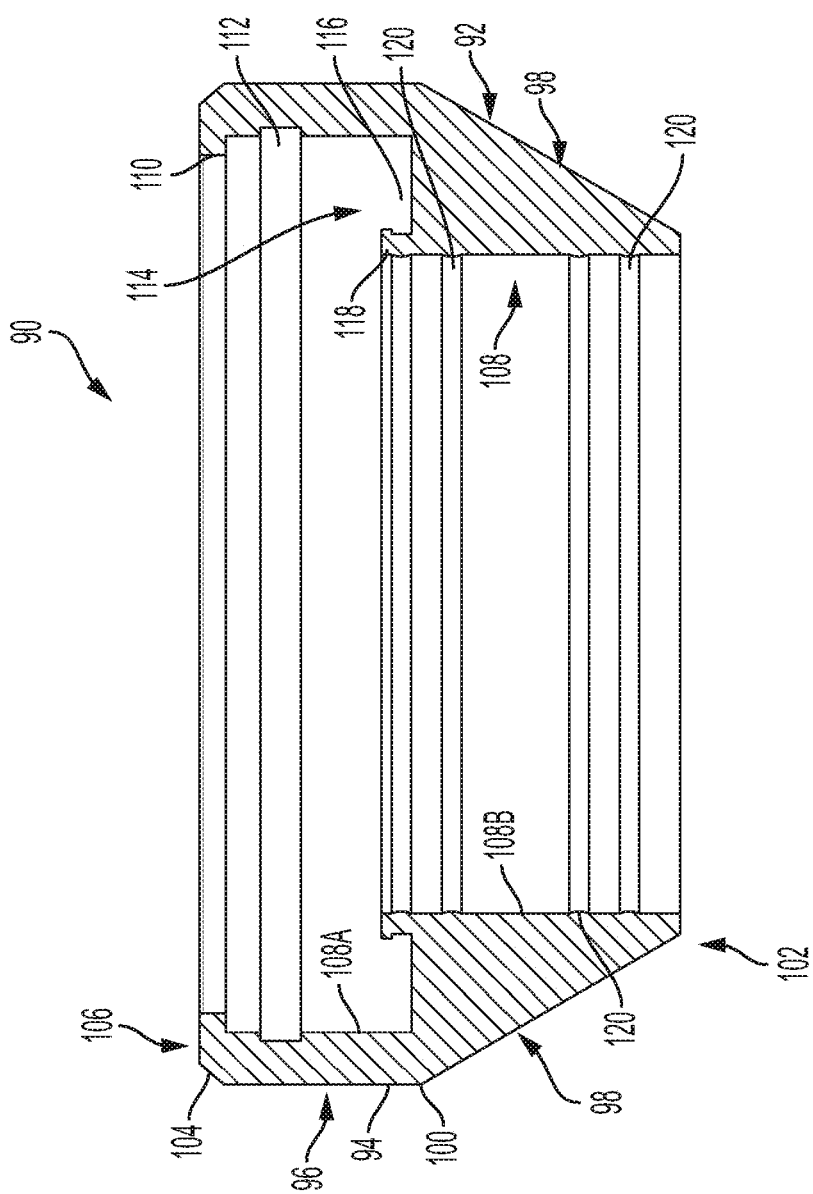
FIG. 4 is a cross-sectional view of the rotary cover sealing element of the present invention.
Figure 5:
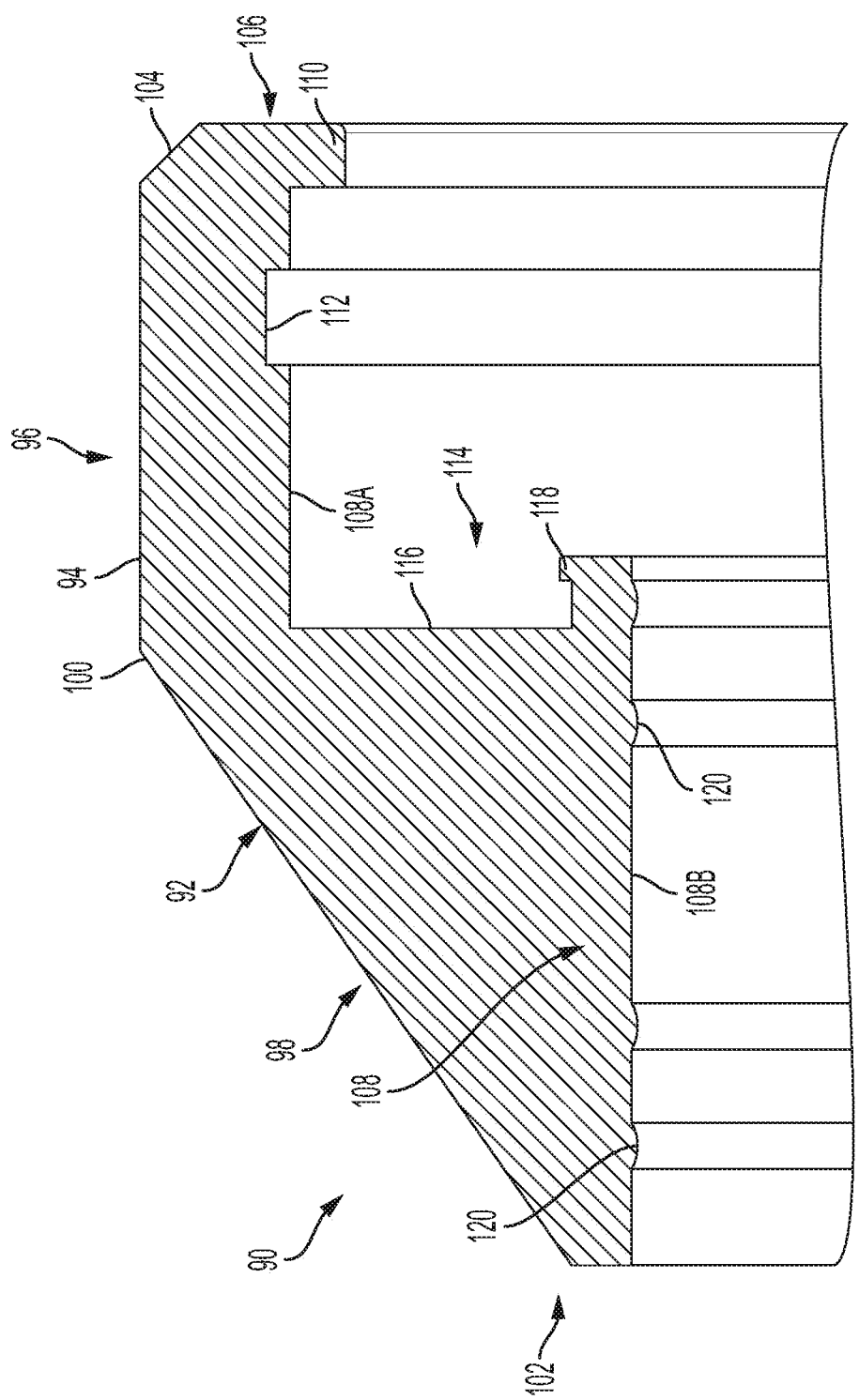
FIG. 5 is a partial cross-sectional view of the rotary cover sealing element of the present invention.

As shown in FIGS. 2A and 2B, the outer surface 94 of the cover sealing element 90 can have an optional pumping element 124 formed thereon. The pumping element 124 can be any selected type of surface feature that helps to move or pump the slurry process fluid about the outer surface 94 of the cover sealing element 90. The pumping element 124 can have any selected shape or configuration and can be formed at any selected location along the outer surface 94. Those of ordinary skill in the art will readily recognize, based on the teachings herein, that any selected number and arrangement of pumping elements 124 can be employed. As shown in FIG. 2A, the pumping elements 24 can be formed only along the tapered end surface portion 98 of the cover sealing element 90. As shown in FIG. 2B, the pumping elements 124 can be formed only along the flat end surface portion 96 or along both the flat end surface portion 96 and the tapered end surface portion 98. The pumping elements 124 help move or expel the abrasive particles present in the slurry from the seal contact area (e.g., sealing surfaces of the seal rings), thus serving to protect the seal rings and prolong the life of the mechanical seal assembly.

Figure 8:
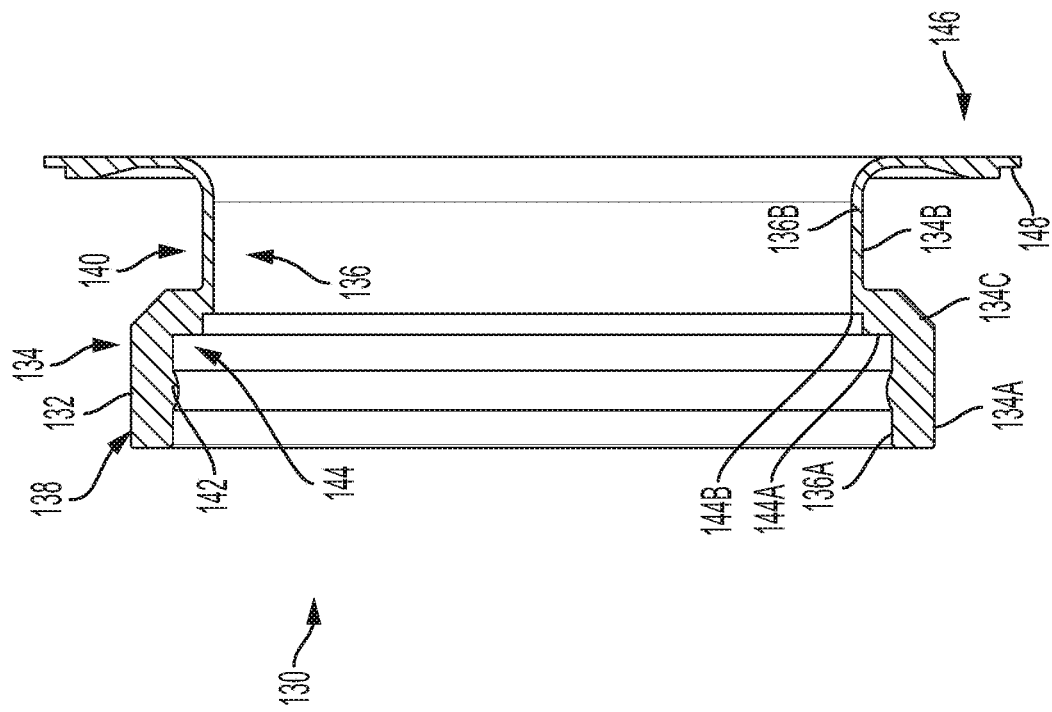
FIG. 8 is a cross-sectional view of the energizer sealing element employed in the mechanical seal assembly of the present invention.
Figure 7:
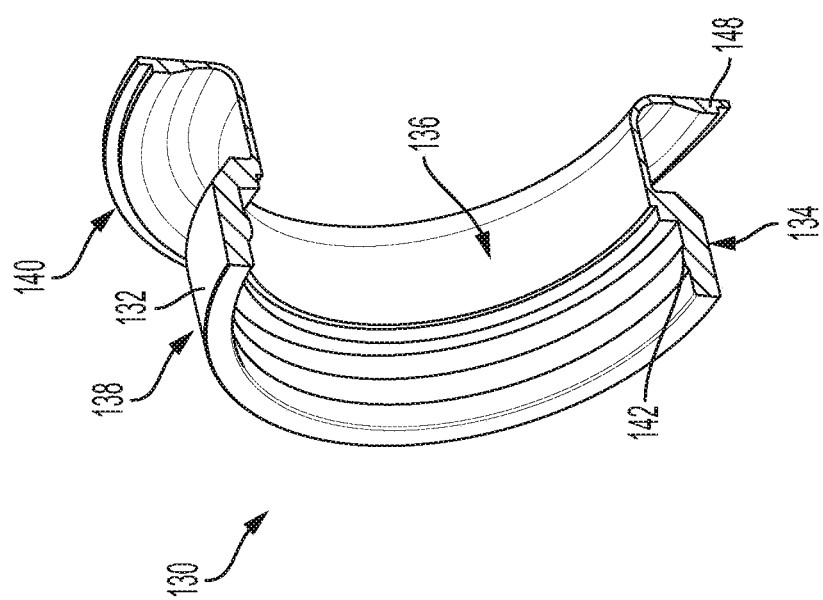
FIG. 7 is a cross-sectional perspective view of an energizer sealing element employed in the mechanical seal assembly of the present invention.
Figure 9:
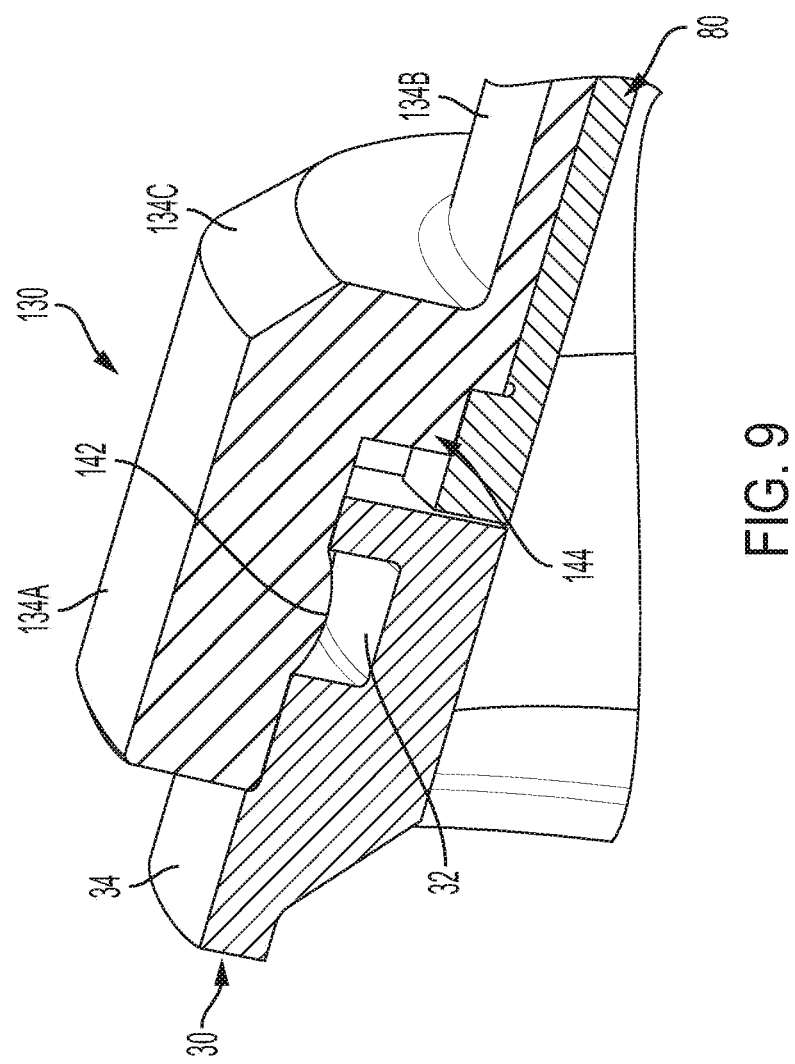
FIG. 9 is a partial cross-sectional perspective view showing the energizer sealing element mounted in the mechanical seal assembly of the present invention.

The mechanical seal assembly 10 of the present invention can also include an energizer sealing element 130. As shown for example in FIGS. 1 and 7-11, the illustrated energizer sealing element 130 is mounted or seated about at least a portion of the stationary seal ring 30 and the support ring element 80, and about a portion of the gland assembly 50. The energizer sealing element 130 helps form a fluid seal at the outboard end of the mechanical seal assembly 10 while concomitantly protecting selected seal components from the slurry process fluid. The illustrated energizer sealing element 130 has a main body 132 having an outer surface 134 and an inner surface 136. The main body 132 also includes a cover portion 138 formed at an axial inner or inboard end and a flex portion 140 formed at an opposed axial outer or outboard end. The cover portion 138 has a relatively flat outer surface 134A and an opposed inner surface 136A. The inner surface 136A can have a surface feature, such as a protrusion 142, formed thereon. The protrusion can help form a capture or retention mechanism. The outer surface 134A also includes an optional slanted surface 134C that transitions to the outer surface 134B that corresponds to the flex portion 140. The outer surface 134B has a terminal end region 146 that includes a connection feature, such as a stepped lip portion 148. The terminal end region 146 that is configured to seat against the gland assembly 50. The flex portion 140 also includes an opposed inner surface 136B. The inner surfaces 136A and 136B are coupled together by a stepped wall portion 144. The stepped wall portion 144 includes a first stepped wall surface 144A that transitions to a second stepped wall surface 144B. The flex portion 140 has a thickness that is smaller than the cover portion 138 that allows the flex portion 140 to bend and flex when mounted within the mechanical seal assembly 10. The flex portion 140 is generally disposed in an unflexed state or position, as shown for example in FIGS. 7 and 8. In the unflexed position, the flex portion has a generally L-shaped configuration. When the energizer sealing element 130 is mounted within the mechanical seal assembly 10, the flex portion 140 can be disposed in a flexed or loaded state or position, as shown for example in FIGS. 1, 10 and 11. In the energized or flexed state or position, the flex portion through the cover portion applies an axial biasing force to the backside of the stationary seal ring 30 so as to force the sealing surfaces or faces of the seal rings into sealing contact with each other. In the flexed state, the flex portion 140 has a generally bent U-shaped configuration since an intermediate portion 170 of the flex portion 140 is bent back to form a pressure cavity 172. The flexed portion formed by the intermediate portion 170 when disposed in the flexed state forms a spring-like portion that applies the axial biasing force. Specifically, the flex portion of the energizer sealing element when disposed in the energized position forms the bent intermediate portion for energizing the stationary seal ring. The pressure cavity 172 formed by the intermediate portion allows the slurry to apply a sealing pressure to flex portion 140 and to apply a biasing force to the cover portion 138 that is transmitted to the stationary seal ring 30. The flex portion of the energizer sealing element is resilient and flexible and can be flexed to form the spring-like intermediate portion.

Figure 11:
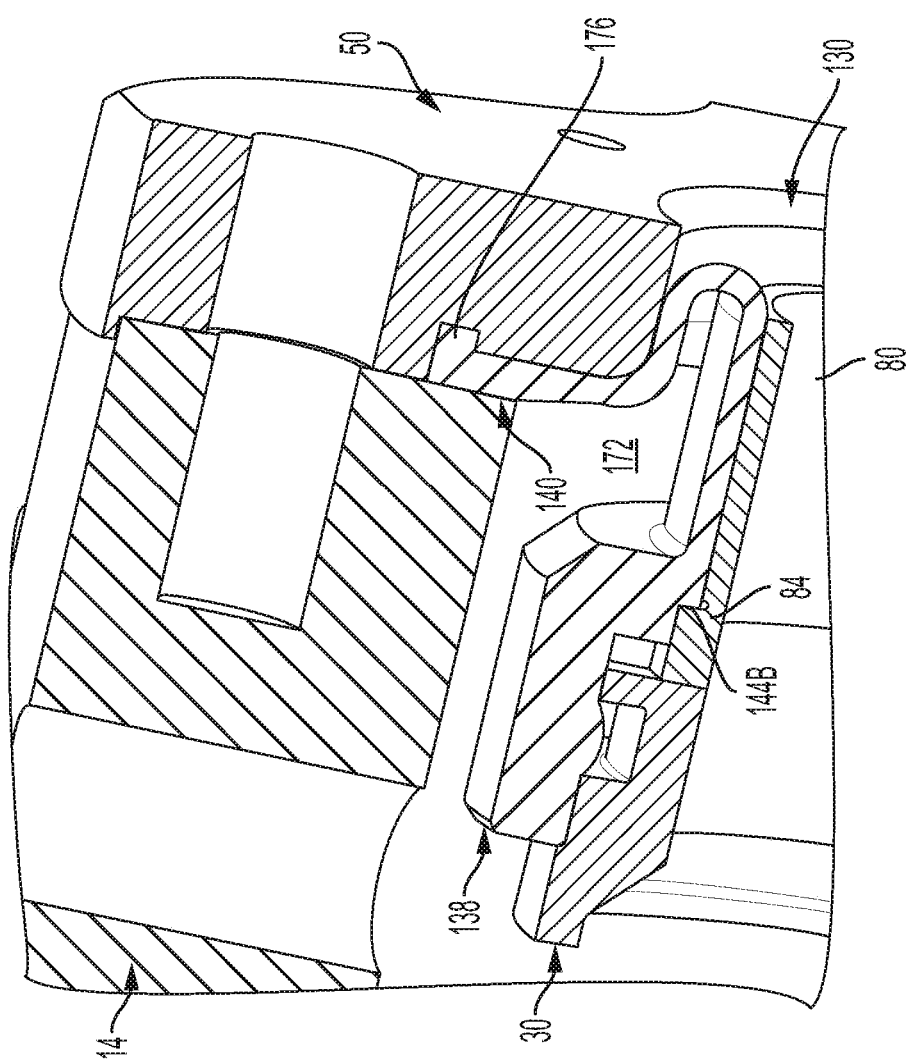
FIG. 11 is a partial cross-sectional perspective view showing the energizer sealing element mounted in the mechanical seal assembly of the present invention.

As shown in FIGS. 1, 10 and 11, when the energizer sealing element 130 is mounted within the mechanical seal assembly 10, the cover portion 138 is mounted over a portion of the outer surface 34 of the stationary sealing element 30. The protrusion 142 formed along the inner surface 136A is aligned with and seats within the channel 32 formed in the outer surface 34 of the stationary seal ring 30. When the cover portion 138 is disposed in this position, the stepped wall surface 144B seats against a wall portion 84 of the support ring element 80. The outer surface 82 of the support ring element 80 contacts the inner surface 136B of the sealing element so as to support and position the energizer sealing element 130 relative to the stationary seal ring 30. The connection feature formed at the terminal end region 146 can be coupled to the gland assembly 50. Specifically, the connection feature includes a lip portion 148 that seats within the gland channel 56. The lip portion 148 is mounted and secured between the inner surface 54 of the gland assembly 50 and the stationary equipment 14 so as to securely seat the terminal end region 146 therebetween. Further, the mechanical alignment and engagement of the protrusion 142 with the channel 32 in the stationary seal ring and the engagement between the stepped wall surface 144B and the wall portion 84 of the support ring element 80 form multiple different capture and retention mechanisms for retaining the energizer sealing element 130 over the stationary seal ring 30. Still further, by securely mounting the flex portion 140 of the energizer sealing element 130 to the gland element and the cover portion 138 to the stationary seal ring 30 and the support ring element 80, allows the flex portion 140 to flex into the flexed state so as to apply an axially biasing force to the stationary seal ring. The bent intermediate portion 170 of the flex portion 140 enables the energizer sealing element 130 to operate in a wide range of pressure conditions since the flex portion can flex to accommodate the pressure fluctuations while concomitantly applying a sufficient biasing force to the stationary seal ring 30. The inner diameter of the cover portion 138 can also be sized so as to form a friction or interference fit with the stationary seal ring 30 when mounted thereabout.

The connection feature of the flex portion 140 of the energizer sealing element 130 can optionally include an additional ridge element 176 that seats within a complementary shaped channel formed in the inner surface of the gland assembly 50.

The energizer sealing element 130 thus helps locate and position the stationary seal ring 30 in defined axial position within the mechanical seal assembly 10. Further, the energizer sealing element 130, such as the cover portion 138, provides or forms a secondary seal to protect at least a portion of the outer surface 34 of the stationary seal ring 30 from potential damage from abrasive particulates present within the slurry process fluid. The flex region 140 operates and functions like an energizer diaphragm or spring biasing element and when mounted within the mechanical seal assembly 10 can have a bent outwardly extended shape. The bent shape serves to absorb pressure fluctuations and to form a spring like portion so as to energize the seal by applying an axial biasing force to the stationary seal ring 30. The flex portion 140 when mounted between the gland assembly 50 and the stationary equipment 14 provides or forms an anti-slip feature that maintains a seal balance line within the mechanical seal assembly 10 and provides an energized preloading force against the seal rings. Further, the positioning of a portion of the flex portion 140 between the gland assembly 50 and the stationary equipment 14 forms a secondary seal and the partial lining of the stationary gland axial surface serves to protect the surfaces from the process fluid abrasive particles.

The cover sealing element 90 and the energizer sealing element 130 can be formed from the same or from different materials. For example, the sealing elements can be formed from polyurethane, such as a thermoset or thermoplastic polyurethane, ethylene propylene diene monomer (EPDM), silicone rubber, reinforced fabric material, or from any type of elastomeric material. The materials used to form the sealing elements preferably have higher abrasion resistance compared to standard metallic materials used in conventional mechanical seal assemblies. The materials can hence be used to protect the components of the seal.

According to another embodiment, an additional spring element can be provided that is mounted between the energizer sealing element 130 and the support ring element 80 and the gland assembly 50 so as to provide an additional amount of spring biasing force to the stationary seal ring.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

We claim:

1. A mechanical seal assembly for mounting about a shaft for sealing a slurry within stationary equipment, comprising
a gland assembly configured for coupling to the stationary equipment, the gland assembly including a main body having a radially extending outer surface and an opposed radially extending inner surface, wherein the main body extends from an axially outer end to a radially inner end and wherein a portion of the radially inner end forms an overhang portion, and wherein the inner surface has a gland channel formed therein in the overhang portion, a rotary seal ring having an outer surface and configured for rotary movement when coupled to the shaft, a stationary seal ring disposed in sealing contact with the rotary seal ring to form a fluid seal therebetween, a sleeve assembly having a main body having a flange portion formed at a first end defining a space for seating the rotary seal ring and a sleeve portion having an outer surface, wherein the main body of the sleeve assembly has an inner surface having an engagement channel formed therein at the first end, a support ring element positioned to contact the outer surface of the sleeve portion of the sleeve assembly, wherein the support ring element has an outer surface and an inner surface, a cover sealing element disposed so as to contact at least a portion of the flange portion of the sleeve assembly and at least a portion of the outer surface of the rotary seal ring, the cover sealing element having an inner surface and an opposed outer surface, wherein the outer surface has a flat end surface portion having a radially inwardly extending end lip portion formed at a terminal end region and a tapered end surface portion coupled to the flat end surface portion, wherein the inner surface of the cover sealing element has a first inner surface having a diameter that is greater than a second radially inwardly stepped inner surface, and wherein the first inner surface and the second inner surface are coupled by a radially extending stepped wall surface having a wall channel formed therein, wherein the wall channel has a wall lip portion that overlies a portion of the wall channel, and wherein a bottom portion of the flange portion seats within the wall channel and the wall lip portion seats within and engages the engagement channel, and an energizer sealing element axially spaced from the cover sealing element and disposed so as to contact at least a portion of the stationary seal ring to apply an axial biasing force thereto, wherein the energizer sealing element has a main body having an outer surface and an inner surface, wherein the main body of the energizer sealing element includes a cover portion formed at a first end thereof and a flex portion formed at an opposed second end thereof, and wherein the flex portion has a terminal end region that includes a connection feature for seating in the gland channel so as to couple the flex portion to the gland assembly.

2. The mechanical seal assembly of claim 1, wherein the first inner surface of the cover sealing element has a cover channel formed therein and wherein the flange portion of the sleeve assembly has a protrusion extending outwardly from an outer surface therefrom for seating within the cover channel.

3. The mechanical seal assembly of claim 2, wherein the inner surface of the cover portion of the energizer sealing element has one or more protrusions formed thereon, and wherein the stationary seal ring has an outer surface having a stator channel formed therein, wherein the protrusion is configured to seat within the stator channel of the stationary seal ring when assembled together.

4. The mechanical seal assembly of claim 3, wherein the connection feature of the flex region of the energizer sealing element comprises a stepped lip portion.

5. The mechanical seal assembly of claim 3, wherein the rotary seal ring has a main body having an outer surface having a rotor channel formed therein, further comprising a sealing element sized and configured for mounting in the rotor channel of the rotary seal ring.

6. The mechanical seal assembly of claim 3, wherein the second inner surface of the cover sealing element has one or more protrusions formed thereon for engaging with the shaft to form a fluid seal between the cover sealing element and the shaft.

7. The mechanical seal assembly of claim 3, wherein:
the inner surface of the cover portion of the energizer sealing element includes a stepped wall portion that includes a first stepped wall surface that transitions to a second stepped wall surface, the support ring element has a first end positioned adjacent to the stationary seal ring and has an annular wall feature formed at the first end, and the inner surface of the cover portion contacts the outer surface of the stationary seal ring and the second stepped wall surface of the cover portion contacts the annular wall feature of the support ring element when assembled together.

8. The mechanical seal assembly of claim 7, wherein the connection feature of the flex portion of the energizer sealing element is configured to seat between the gland assembly and the stationary equipment when assembled together.

9. The mechanical seal assembly of claim 7, wherein the flex portion of the energizer sealing element is disposed in an energized position when the energizer sealing element is coupled to the gland assembly and to the stationary seal ring, and wherein the flex portion of the energizer sealing element when disposed in the energized position forms a bent intermediate portion for energizing the stationary seal ring.

10. A mechanical seal assembly for mounting about a shaft for sealing a slurry within stationary equipment, comprising a gland assembly configured for coupling to the stationary equipment, wherein the gland assembly including a main body having a radially extending outer surface and an opposed radially extending inner surface, wherein the main body extends from an axially outer end to a radially inner end and wherein a portion of the radially inner end forms an overhang portion, and wherein the inner surface has a gland channel formed therein in the overhang portion, a rotary seal ring having an outer surface and configured for rotary movement when coupled to the shaft, a stationary seal ring disposed in operative sealing contact with the rotary seal ring to form a fluid seal therebetween, a sleeve assembly having a main body having a flange portion formed at a first end defining a space for seating the rotary seal ring and a sleeve portion having an outer surface, wherein the main body of the sleeve assembly has an inner surface having an engagement channel formed therein at the first end, a support ring element positioned to contact the outer surface of the sleeve portion of the sleeve assembly, wherein the support element has an outer surface and an inner surface, a cover sealing element disposed so as to contact at least a portion of the flange portion of the sleeve assembly and at least a portion of the outer surface of the rotary seal ring, the cover sealing element having an inner surface and an opposed outer surface, wherein the inner surface of the cover sealing element has a first inner surface having a diameter that is greater than a second radially inwardly stepped inner surface, and wherein the first inner surface and the second inner surface are coupled by a radially extending stepped wall surface having a wall channel formed therein, wherein the wall channel has a wall lip portion that overlies a portion of the wall channel, and wherein a bottom portion of the flange portion seats within the wall channel and the wall lip portion seats within and engages the engagement channel, and an energizer sealing element axially spaced from the cover sealing element and disposed so as to contact at least a portion of the stationary seal ring to apply an axial biasing force thereto, wherein the energizer sealing element has a main body having an outer surface and an inner surface, wherein the main body of the energizer sealing element includes a cover portion formed at a first end thereof and a flex portion formed at an opposed second end thereof, and wherein the flex portion has a terminal end region that includes a connection feature for seating in the gland channel so as to couple the flex portion to the gland assembly.

11. The mechanical seal assembly of claim 10, wherein the outer surface of the cover sealing element has a flat end surface portion having a radially inwardly extending end lip portion formed at a terminal end region and a tapered end surface portion coupled to the flat end surface portion.

12. The mechanical seal assembly of claim 11, wherein the first inner surface of the cover sealing element has a cover channel formed therein and wherein the flange portion of the sleeve assembly has a protrusion extending outwardly from an outer surface therefrom for seating within the cover channel.

13. The mechanical seal assembly of claim 12, wherein the inner surface of the cover portion of the energizer sealing element has one or more protrusions formed thereon, and wherein the stationary seal ring has an outer surface having a stator channel formed therein, wherein the protrusion is configured to seat within the stator channel of the stationary seal ring when assembled together.

14. The mechanical seal assembly of claim 13, wherein the connection feature of the flex region of the energizer sealing element comprises a stepped lip portion.

15. The mechanical seal assembly of claim 13, wherein:
the inner surface of the cover portion of the energizer sealing element includes a stepped wall portion that includes a first stepped wall surface that transitions to a second stepped wall surface,
the support ring element has a first end positioned adjacent to the stationary seal ring and has an annular wall feature formed at the first end, and
the inner surface of the cover portion contacts the outer surface of the stationary seal ring and the second stepped wall surface of the cover portion contacts the annular wall feature of the support ring element when assembled together.

16. The mechanical seal assembly of claim 15, wherein the connection feature of the flex portion of the energizer sealing element is configured to seat between the gland assembly and the stationary equipment when assembled together.

17. The mechanical seal assembly of claim 15, wherein the flex portion of the energizer sealing element is disposed in an energized position when the energizer sealing element is coupled to the gland assembly and to the stationary seal ring, and wherein the flex portion of the energizer sealing element when disposed in the energized position forms a bent intermediate portion for energizing the stationary seal ring.

* * * * *